Dec. 26, 1967     E. S. WEST, JR     3,360,222
TURBO-PROP ENGINE MOUNT FOR AIRCRAFT
Filed Oct. 21, 1965     2 Sheets-Sheet 1
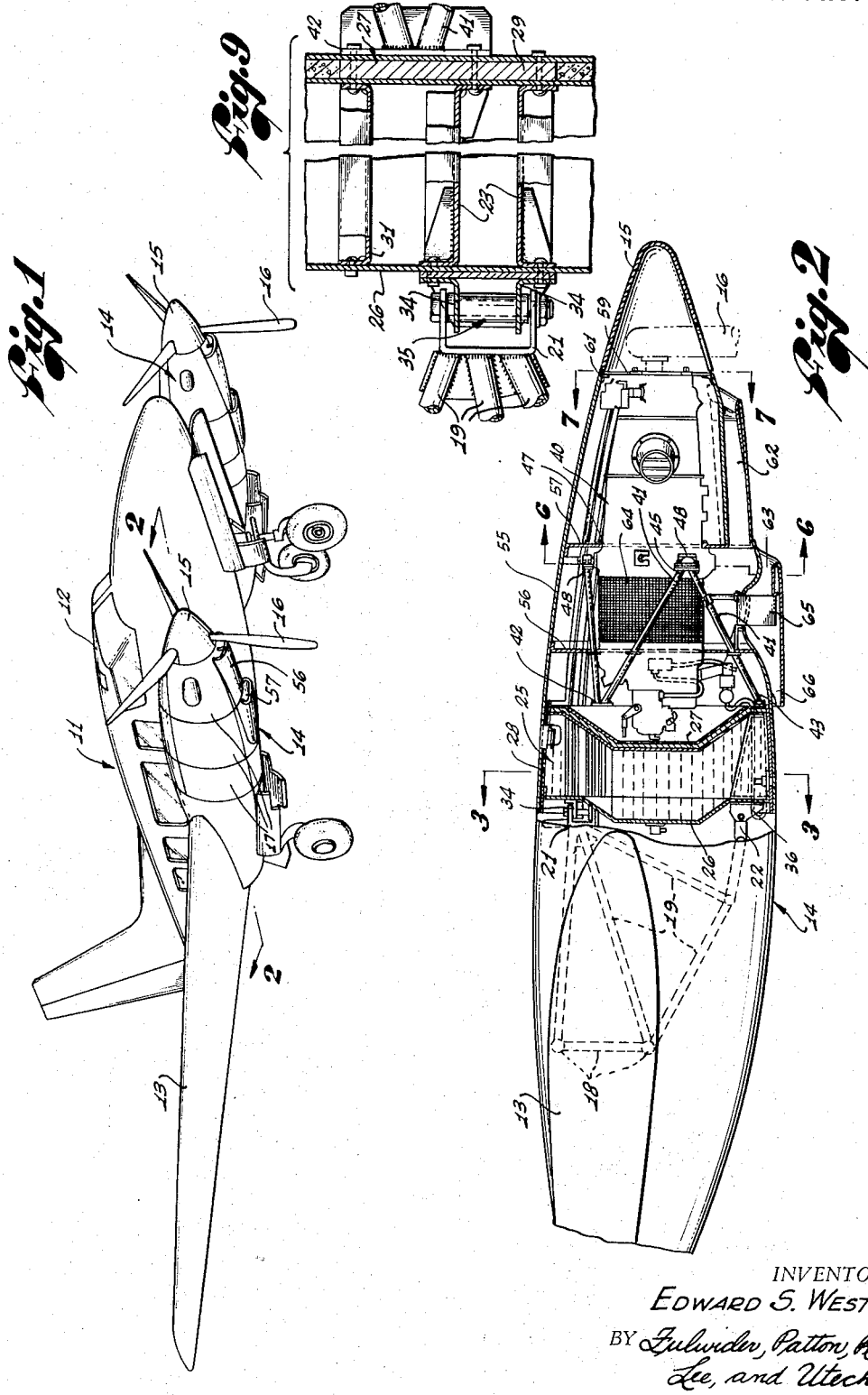
INVENTOR.
EDWARD S. WEST JR.
BY Fulwider, Patton, Rieber,
Lee, and Utecht
ATTORNEYS

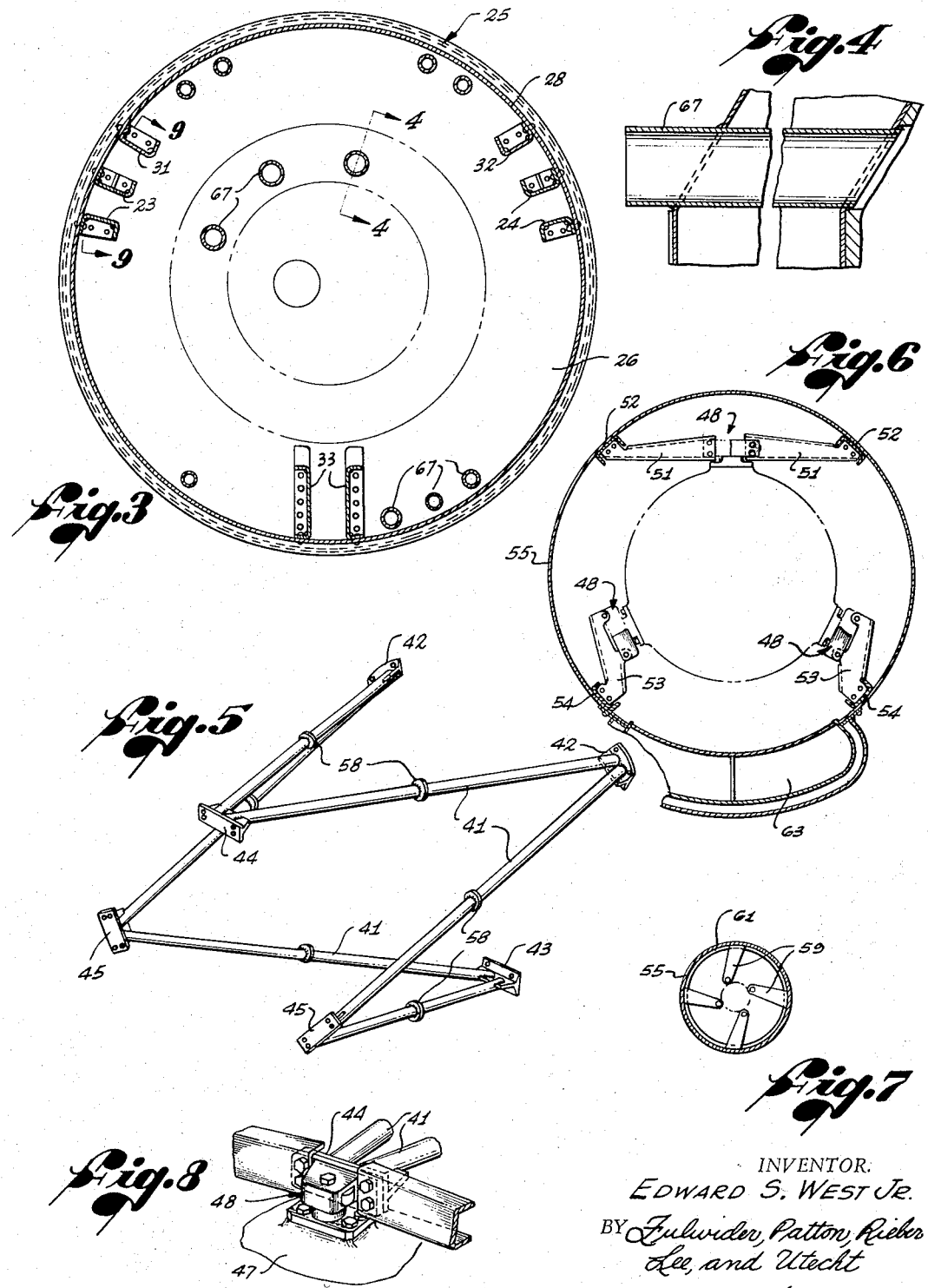

United States Patent Office 3,360,222
Patented Dec. 26, 1967

3,360,222
TURBO-PROP ENGINE MOUNT FOR AIRCRAFT
Edward S. West, Jr., Pasadena, Calif., assignor to American Turbine Aircraft Corporation, Long Beach, Calif., a corporation of California
Filed Oct. 21, 1965, Ser. No. 500,033
11 Claims. (Cl. 244—54)

ABSTRACT OF THE DISCLOSURE

A streamlined, aerodynamically clean nacelle mounting for a turbo-prop engine for both original aircraft construction and for conversion from piston engine power including a forwardly projecting, streamlined nacelle mounted to and extending forwardly of the aircraft wing and a mounting system supported on a structural spar within the wing and extending forwardly into the nacelle to support a drum-like fuel tank whose peripheral surface fits closely within the nacelle and a turbo-prop engine in the forward end of the nacelle ahead of the fuel tank, and including a second mounting system extending forwardly from the fuel tank to support the turbo-prop engine, together with brackets extending through the tank and interconnecting the mounting systems at the back and front of the tank. A pair of fire walls are provided between the engine casing and the nacelle with the engine air intake therebetween and an air scoop beneath the nacelle leads into the chamber between the fire walls. The forward end of the rear mounting system and the rear end of the forward mounting system have complementary three-point connections while the forward end of the forward mounting system provides a reversed three-point suspension.

---

The present invention relates to engine mounting structure for airplanes and more particularly to the mounting of turbo-prop engines thereon in streamlined nacelles.

While the present invention may obviously be used in the manufacture of new aircraft, it is also advantageously usable in the modification of existing aircraft from piston engine power to turbo-prop operation, with consequent major increase in performance. This is particularly true with respect to executive type aircraft which have heretofore been supplied and now exist in large numbers with relatively low-powered and high drag piston engine power plants. The present invention substitutes for these piston engine power plants, turbo-prop engines of small diameter and high power which are supported with axially aligned fuel tanks within streamlined nacelles. These integral nacelle-mounted fuel tanks supplement conventional wing tanks without increasing the areodynamic drag on the aircraft, and thus increase the fuel capacity and range of the aircraft without drag penalty.

It is therefore an object of the present invention to provide an improved mounting for turbo-prop engines in nacelles on an airplane.

Another object is the provision of an improved turbo-prop engine mounting for airplanes including an integral fuel tank mounted with the engine within a streamlined nacelle.

A further object of this invention is the provision of an improved mounting for a turbo-prop engine substituted for a piston engine in aircraft and utilizing elements of the piston engine support.

Yet another object of this invention is the provision of an improved streamlined nacelle mounting for a turbo-jet engine for aircraft, including an integral fuel tank within the nacelle.

These and other objects and features of the invention will be apparent to those skilled in the art from the following specification and the appended drawings, in which:

FIGURE 1 is a perspective view of an aircraft employing the turbo-prop engine mounting according to the present invention;

FIGURE 2 is a side elevational view of an engine mount and nacelle according to the present invention with parts broken away and other parts shown in section and elevation;

FIGURE 3 is a transverse sectional view through the nacelle-mounted fuel tank;

FIGURE 4 is a detail of the fuel tank taken on line 4—4 of FIGURE 3;

FIGURE 5 is a perspective view of the engine supporting arms forwardly of the fuel tank;

FIGURE 6 is a transverse sectional view on the line 6—6 of FIGURE 2;

FIGURE 7 is a transverse sectional view on the line 7—7 of FIGURE 2;

FIGURE 8 is a perspective view of an engine mounting detail including nacelle longeron supports; and FIGURE 9 is a detail sectional view of the engine-supports at opposite sides of and extending through the fuel tank.

The aircraft 11 of FIGURE 1 may be of conventional fixed wing type having a fuselage 12 and wings 13 which support and from which extend forwardly the engine support and from which extend forwardly the engine nacelles 14. Forwardly of the nacelles 14 are spinner caps 15 through which project propeller blades 16. The nacelles 14 may be made up of any desired number of sections, as indicated at 17 in FIGURE 1, certain of which may be readily individually removable to give access to the interior for servicing. The wings 13 may be of conventional construction, including longitudinally extending spars 18 which also serve to support the engines and nacelles. For this purpose, a system of supporting rods or tubes 19 is connected to the spars 18 and extends forwardly in the nacelle to terminates in a three-point support including a pair of horizontally spaced upper supports 21 and a lower support 22. The locations and spacing of the upper pair of supports 21 correspond to the locations of the pairs of brackets 23 and 24 which connect to these supports and extend through the fuel tank 25, as shown more particularly in FIGURES 2, 3 and 9.

The fuel tank 25, in the illustrated exemplary embodiment, consists of a pair of concavo-convex walls 26 and 27 which extend in generally parallel transverse relation and are circumferentially joined by a cylindrical portion 28 to form a generally cylindrical, drum-like, enclosed tank having a circumference substantially equal to the internal dimension thereat of the nacelle 14. The wall 27 is desirably of sandwich construction including an insulating layer 29. Extending through the tank 25 and connected to its opposite walls 26 and 27 are a plurality of brackets of which the pairs 23 and 24 have been previously referred to and also including brackets 31 and 32 adjacent thereto and a pair of bottom brackets 33.

At the supports 21 the pairs of brackets 23, 24 connect to brackets 34 at the back face of the wall 26. The brackets 34 connect through a tube and bolt connection 35 to the supports 21 to securely mount the back of the tank 25 to the supports 21. At the bottom of the tank the brackets 33 connect to brackets 36 at the back face of the wall 26 and the brackets 36 are in turn connected to the bottom support 22. By the above arrangement the tank 25 is mounted to and securely supported from the wing spars 18 through the tube supports 19.

Forwardly of the fuel tank 25 the turbo-prop engine 40 is mounted and supported by a system of supporting tubes 41 extending from the fuel tank to the engine, as shown in FIGURE 2, the tube system being shown alone in perspective in FIGURE 5. The supporting tube system 41 provides a three-point connection at both ends, but reversed top for bottom from back to front. At the back the supporting tube system 41 provides three-point support including a pair of connection brackets 42 spaced horizontally at the top and a third connection bracket 43 at the bottom. One bracket 42 connects through the tank wall 27 with the bracket 31 and the adjacent one of the bracket pair 23, as shown more particularly in the detail of FIGURE 9. The other bracket 42 connects through the tank wall 27 with bracket 32 and the adjacent one of the bracket pair 24, in the same way. The bracket 43 connects through the tank wall 27 with the brackets 33. The brackets 42 and 43 are thereby securely connected through the tank and the brackets extending therethrough with the supports 21 and 22.

The system of supporting tubes 41 terminates forwardly in a reversed three-point suspension including a single top bracket 44 and a pair of horizontally spaced bottom brackets 45 which connect to engine mounting brackets, as illustrated in FIGURES 6 and 8.

A turbo-prop engine is indicated generally at 40 with an exterior casing 47 to which the engine supporting brackets are connected. Upon the casing 47 are mounted shock absorbing brackets, indicated generally at 48 in FIGURE 8, to which are secured the mounting brackets 44, 45. In the arrangement illustrated more particularly in FIGURE 6, the brackets 48 may be of conventional shock-mounting construction whereby the engine is supported from the pipe system 41 and brackets 44, 45 through a resilient, rubber-like support. By this means, the engine 40 is securely mounted through its casing 47, the brackets 48, brackets 44, 45, supporting pipe system 41, brackets 42, 43, the fuel tank 25 and the bracket system 23, 24, 31, 32, 33, and brackets 34, 36 to the supports 21, 23, and thence through the supporting tube system 19 to the wing spars 18.

The brackets 48 also support the nacelle longerons, as shown in FIGURES 6 and 8. The top bracket 48 supports a pair of arms 51 which extend to the opposite sides and support the nacelle longerons 52. The lower brackets 48 support arms 53 which carry like nacelle longerons 54. The skin 55 of the nacelles is supported on these longerons to form an aerodynamically clean nacelle enclosure for the engine 40 and the fuel tank 25 which is faired into the surface of the wing 13.

The interior of the nacelle 14 is compartmentalized by a pair of fire walls 56 and 57 which extend between the skin 55 of the nacelle and the engine casing 47. The supporting tube system 41 etxends through the wall 56 and is provided with flanges 58 to overlap the openings therethrough through which the tube system extends. At the forward end of the engine 40 arms 59 support a ring 61 on which the forward end of the skin 55 is supported.

The lower portion of the nacelle 14 is provided with a pair of air scoops 62 and 63. The air from scoop 62 enters the chamber between the fire walls 56 and 57 and passes through the engine screen 64 into the engine compressor. Air from the scoop 63 passes through the oil cooler 65 and thence to the outside through exit 66. In back of the fire wall 56 and forwardly of the tank 25 are mounted various engine accessories, such as fuel strainer, fuel pump, fuel heater, etc. The tank 25 has a number of passage-defining tubes 67 extended therethrough and sealed to its opposite walls, as shown in FIGURE 4. These serve to lead fuel and control lines from the wings 13 through the nacelle 14 and fuel tank 25 to the engine. Fuel from the tank 25 may likewise be ported from the back wall 26 through these tubular passages.

The airplane 11 may have the usual primary fuel tanks within the wings 13 to supply the engine 40 and the nacelle tanks 25 serve to supplement the capacity of these wing tanks without adding areodynamic drag to the airplane, since they are encased within the streamlined nacelles 14 and do not appreciably increase the drag thereon. This extends the range of the turbo-prop plane without drag penalty.

The arrangement described securely mounts the auxiliary integral nacelle tank and the turbo-prop engine from the airplane wing spars in a streamlined, aerodynamically clean nacelle and, as originally stated, has desirable features not only for original aircraft construction, but even more particularly in converting existing piston engine powered aircraft to the nacelle enclosed, low drag and more powerful turbo-prop engines. In this latter case, the exemplary modification will utilize substantially similar supports 21 and 22 and the supporting tube system 19 leading to the wing spars 18 which were provided for the piston engine mounts, thus minimizing the extent of the conversion modification, particularly with respect to the wing construction.

While certain preferred embodiments of the invention have been specifically illustrated and described, it is understood that the invention is not limited thereto as many variations will be apparent to those skilled in the art and the invention is to be given its broadest interpretation within the terms of the following claims.

I claim:

1. In a turbo-prop engine mount for fixed wing aircraft, a streamlined nacelle enclosure for said engine mounted to and extending forwardly of the aircraft wing; an aircraft structural part; rear mounting means extending forwardly from said aircraft structural part into said nacelle; a generally cylindrical fuel tank supported on the forward end of said rear mounting means within said nacelle with the axis of the tank aligned with the nacelle axis and with said tank occupying substantially the entire cross-section of the nacelle; forward mounting means connected to and extending forwardly of said fuel tank within said nacelle; and a turbo-prop engine within the forward portion of said nacelle and mounted on said last-mentioned mounting means.

2. In a turbo-prop engine mount for fixed wing aircraft, a streamlined nacelle enclosure for said engine mounted to and extending forwardly of the aircraft wing; an aircraft structural part; rear mounting means extending forwardly from said aircraft structural part into said nacelle; a generally cylindrical fuel tank supported on the forward end of said rear mounting means within said nacelle with the axis of the tank aligned with the nacelle axis and with said tank occupying substantially the entire cross-section of the nacelle; forward mounting means connected to and extending forwardly of said fuel tank within said nacelle; a turbo-prop engine within the forward portion of said nacelle and mounted on said last-mentioned mounting means; and a structural means extending through said tank from front to back and interconnecting said forward and rear mounting means.

3. In a turbo-prop engine mount for fixed wing aircraft, a streamlined nacelle enclosure for said engine mounted to and extending forwardly of the aircraft wing; an aircraft structural part; rear mounting means extending forwardly from said aircraft structural part into said nacelle; a generally cylindrical fuel tank supported on the forward end of said rear mounting means within said nacelle with the axis of the tank aligned with the nacelle axis and with said tank occupying substantially the entire cross-section of the nacelle; forward mounting means connected to and extending forwardly of said fuel tank within said nacelle; a turbo-prop engine within the forward portion of said nacelle; mounting brackets on said engine engaged by the forward ends of said forward mounting means; longitudinally extending longerons within the nacelle for supporting it; and means extending from said engine mounting brackets to said longerons for supporting said longerons.

4. In a turbo-prop engine mount for fixed wing aircraft, a nacelle mounted to and extending forwardly of the aircraft wing; a structural spar within said wing; a mounting system supported on said spar and extending forwardly into said nacelle; a drum-like fuel tank whose peripheral surface substantially corresponds to the internal surface of the nacelle thereat supported on the forward end of said mounting system; a turbo-prop engine in the forward end of said nacelle ahead of said fuel tank; and a second mounting system extending forwardly from said fuel tank and engaging and supporting said engine.

5. In a turbo-prop engine mount for fixed wing aircraft, a nacelle mounted to and extending forwardly of the aircraft wing; a structural spar within said wing; a mounting system supported on said spar and extending forwardly into said nacelle; a drum-like fuel tank whose peripheral surface substantially corresponds to the internal surface of the nacelle thereat supported on the forward end of said mounting system; a turbo-prop engine in the forward end of said nacelle ahead of said fuel tank; a second mounting system extending forwardly from said fuel tank and engaging and supporting said engine; and structural means extending through said fuel tank and interconnecting said mounting systems.

6. In a turbo-prop engine mount for fixed wing aircraft, a nacelle mounted to and extending forwardly of the aircraft wing; a structural spar within said wing; a mounting system supported on said spar and extending forwardly into said nacelle; a drum-like fuel tank whose peripheral surface substantially corresponds to the internal surface of the nacelle thereat supported on the forward end of said mounting system; a turbo-prop engine in the forward end of said nacelle ahead of said fuel tank; a second mounting system extending forwardly from said fuel tank; and brackets at the exterior of said engine connected to the forward end of said second mounting system to support said engine in place.

7. In a turbo-prop engine mount for fixed wing aircraft, a nacelle mounted to and extending forwardly of the aircraft wing; a structural spar within said wing; a mounting system supported on said spar and extending forwardly into said nacelle; a drum-like fuel tank whose peripheral surface substantially corresponds to the internal surface of the nacelle thereat supported on the forward end of said mounting system; a turbo-prop engine in the forward end of said nacelle ahead of said fuel tank; a second mounting system extending forwardly from said fuel tank; brackets at the exterior of said engine connected to the forward end of said second mounting system to support said engine in place; longerons extending longitudinally of said nacelle and forming a support therefor; and supporting arms extending from said engine support brackets to support said longerons in spaced relation to the engine.

8. In a turbo-prop engine mount for fixed wing aircraft, a nacelle mounted to and extending forwardly of the aircraft wing; a structural spar within said wing; a mounting system supported on said spar and extending forwardly into said nacelle; a drum-like fuel tank whose peripheral surface substantially corresponds to the internal surface of the nacelle thereat supported on the forward end of said mounting system; a turbo-prop engine in the forward end of said nacelle ahead of said fuel tank; a second mounting system extending forwardly from said fuel tank; brackets at the exterior of said engine connected to the forward end of said second mounting system to support said engine in place; a fire wall in front of said engine brackets extending from the engine casing to the interior surface of the nacelle; and a second fire wall rearwardly of said first fire wall and in front of said fuel tank through which said second mounting system passes in supporting the engine, said second fire wall also extending between the engine casing and the interior surface of the nacelle.

9. In a turbo-prop engine mount for fixed wing aircraft, a nacelle mounted to and extending forwardly of the aircraft wing; a structural spar within said wing; a mounting system supported on said spar and extending forwardly into said nacelle; a drum-like fuel tank whose peripheral surface substantially corresponds to the internal surface of the nacelle thereat supported on the forward end of said mounting system; a turbo-prop engine in the forward end of said nacelle ahead of said fuel tank; a second mounting system extending forwardly from said fuel tank; and brackets at the exterior of said engine connected to the forward end of said second mounting system to support said engine in place, said first mounting system having a forward-three-point suspension with two top horizontally-spaced supporting brackets and a single bottom supporting bracket, said second mounting system having a similar rear supporting bracket arrangement, the forward and engine-engaging end of said second mounting system having a reversed-three-point suspension with a single supporting bracket at the top and a pair of horizontally-spaced supporting brackets at the bottom.

10. In a turbo-prop engine mount for fixed wing aircraft, a nacelle mounted to and extending forwardly of the aircraft wing; a structural spar within said wing; a mounting system supported on said spar and extending forwardly into said nacelle; a drum-like fuel tank whose peripheral surface substantially corresponds to the internal surface of the nacelle thereat supported on the forward end of said mounting system; a turbo-prop engine in the forward end of said nacelle ahead of said fuel tank; a second mounting system extending forwardly from said fuel tank; brackets at the exterior of said engine connected to the forward end of said second mounting system to support said engine in place; a fire wall in front of said engine brackets extending from the engine casing to the interior surface of the nacelle; a second fire wall rearwardly of said first fire wall and in front of said fuel tank through which said second mounting system passes in supporting the engine, said second fire wall also extending between the engine casing and the interior surface of the nacelle; an engine air inlet between said fire walls; and an air scoop beneath said nacelle and leading into the chamber between said fire walls to feed combustion air to the engine.

11. In a turbo-prop engine mount for fixed wing aircraft, a nacelle mounted to and extending forwardly of the aircraft wing; a structural spar within said wing; a mounting system supported on said spar and extending forwardly into said nacelle; a drum-like fuel tank whose peripheral surface substantially corresponds to the internal surface of the nacelle thereat supported on the forward end of said mounting system; a turbo-prop engine in the forward end of said nacelle ahead of said fuel tank; a second mounting system extending forwardly from said fuel tank; brackets at the exterior of said engine connected to the forward end of said second mounting system to support said engine in place; a fire wall in front of said engine brackets extending from the engine casing to the interior surface of the nacelle; a second fire wall rearwardly of said first fire wall and in front of said fuel tank through which said second mounting system passes in supporting the engine, said second fire wall also extending between the engine casing and the interior surface of the nacelle; an engine air inlet between said fire walls; an air scoop beneath said nacelle and leading into the chamber between said fire walls to feed combustion air to the engine; a second air scoop beneath said nacelle and rearwardly spaced from said first air scoop; an isolated passage fed by said second air scoop; and an engine oil cooler in said passage.

References Cited

UNITED STATES PATENTS

| | | | |
|---|---|---|---|
| 2,398,704 | 4/1946 | Gassner | 244—54 |
| 2,539,960 | 1/1951 | Marchant et al. | 244—54 X |
| 3,020,004 | 2/1962 | Blyth et al. | 244—54 |
| 3,059,879 | 10/1962 | Tatone | 244—54 |
| 3,098,632 | 7/1963 | Christenson | 244—54 |
| 3,112,903 | 12/1963 | Conrad | 244—54 |

FERGUS S. MIDDLETON, *Primary Examiner.*

MILTON BUCHLER, *Examiner.*

B. BELKIN, *Assistant Examiner.*